United States Patent Office 3,223,629
Patented Dec. 14, 1965

3,223,629
LUBRICANT COMPOSITIONS
Donald E. Loeffler, Walnut Creek, Calif., assignor to Shell Oil Company, New York, N.Y., a corporation of Delaware
No Drawing. Filed May 13, 1963, Ser. No. 280,124
7 Claims. (Cl. 252—28)

This invention relates to an improved process for the preparation of clay grease compositions. More particularly, it pertains to an improved method for the preparation of resin-coated clay grease compositions.

The manufacture of greases gelled with inorganic colloids and particularly with clay has been disclosed in the prior art. In order to maintain the water stability of such greases, it is necessary to provide the clay with hydrophobic surfaces or to otherwise protect it. Various means for achieving this have been proposed in the art such as providing hydrophobic surface-active agents including amines, imidazolines, amidoamines and the like. A special high-temperature problem has been solved by the water-proofing of such greases with thermosetting resins. It is the latter type of composition and its preparation with which this invention is especially concerned.

The main problem involved in the preparation of clay greases is the economic distribution of clay in its highly swollen form throughout a lubricating oil so that it will provide suitable grease-forming properties. This can be done by various means such as the "aerogel" process, wherein the colloid is dispersed in a swelling medium such as water, the water displaced with a volatile organic water-miscible solvent and the remaining organo gel heated in an autoclave to a temperature above the critical temperature of solvent with removal of the latter by flashing. This is an expensive process which it would be desirable to avoid. An alternative process involves solvent displacement. In this process, an aqueous dispersion, usually a hydrogel, of the inorganic colloid is treated with a water-miscible organic solvent such as alcohol or acetone to displace the water, after which the polymer-forming monomers and oil are added. Subsequently, the volatile solvent is removed by evaporation and the remaining ingredients are heated to polymerize and cure the thermosetting resin. The shortcoming with such a process is the poor filterability characteristics of a hydrogel such as is formed by dispersion of a high base exchange clay or the like in water. This can be reduced somewhat by displacement solvents or by filtration, but this involves the use of relatively large amounts of such solvents and relatively expensive processing techniques. A further improvement on the process for the preparation of such greases comprise the addition of a monomeric thermo resin forming material such as aniline to the clay hydrogel for the purpose of improving the filterability of the latter. While this causes a material improvement in the rate of filtration and water removal, it still requires subsequent water displacement with an organic solvent such as methanol, ethanol or acetone. It has been found that even this improved process could not suitably compete economically with grease processes utilizing other high-temperature gelling agents and avoiding such solvent displacement techniques.

One of the economic processes for the production of greases gelled with clays comprises the dispersal of clay in water and admixture of the hydrosols so formed with an oil containing an oleophilic surface active agent in an amount sufficient to provide substantially increased water-resistant properties for the clay gel. Under such circumstances it has been found possible to cause a phase transfer of the clay from water into oil and separation of a substantial amount of water by simple mechanical means such as decanting or its equivalent. This has heretofore been the most economic method for the incorporation of clay in its proper form into an oil while at the same time avoiding relatively expensive methods for water removal. However, the cationic surfactants utilized for this purpose (while providing desirable hydrophobic properties) are not as thermally stable as would be desired for greases to be used at relatively elevated temperatures. The presence of the clay on which the cationic surfactant is absorbed or reacted appears to act as a catalyst for the decomposition of a cationic surfactant at such elevated temperatures. Even when employing the most stable of lubricating oils used as the principal ingredient for the grease compositions and only very small amounts of cationic surfactant, the grease therefrom is found to lack sufficient thermal stability.

It is an object of the present invention to provide an improved process for the preparation of high-temperature grease compositions. It is a special object of this invention to provide an improved process for the preparation of clay-thickened greases. It is another object of the invention to provide a process for the preparation of high-temperature clay greases waterproofed with thermosetting resins wherein the solvent displacement step is avoided and direct transfer of the clay from water into oil is effected without the use of cationic surfactants which tend to reduce the thermal and/or oxidation stability of the resultant grease compositions.

Now, in accordance with this invention, a process is provided for the preparation of polymer-coated clay grease compositions which comprises (1) forming an acid hydrogel of a clay, the amount of acid being in excess of the amount required to acidify the clay particles dispersed throughout the hydrogel; (2) admixing therewith at least two aminoplastforming coreactants; (3) boiling the mixture of hydrogel and aminoplastforming coreactants to form a thermosetting resin; (4) water-washing and filtering the boiled mixture to remove acid and most of the water; (5) admixing a thermally stable lubricating oil with the filtered residue; (6) substantially completely dehydrating the admixture of oil and residue; and (7) milling the dehydrated admixture to form a grease structure.

In the process according to the invention, clay is dispersed in water for two principal reasons: First, to separate the non-clay contaminants (generally referred to as gangue), and secondly, to swell the clay particles to their maximum extent so as to enable them to perform their function as gelling agents for the grease to be made therefrom. In the case of high base exchange capacity clays, the dispersion of clay in water results in formation of a hydrogel; however the form of the suspension is not an essential aspect of the invention and will vary with the physical properties of the clay.

In order to keep the clay hydrogel in workable (fluid) concentration, it is preferred that the clay be dispersed to yield a hydrogel containing between about 0.25% and about 3% by weight of dry clay, based on the hydrogel before mechanical separation of water therefrom. This percentage is based upon dry weight of de-gangued clay and not upon the dry weight of clay containing naturally occurring contaminants. While the clay is largely dispersed throughout the entire body of the water in which it is incorporated, it is in the form of jelly-like colloidal globules which can be isolated by mechanical separation from a large part of the water to yield a clay hydrogel of substantially increased clay content without shrinking the expanded colloidal structure of the clay. By "mechanical separation" is meant any process for the separation of water from the colloid which does not involve a change in physical state such as occurs in normal evaporation methods and the like. Consequently, mechanical separation normally includes filtration techniques and accelerated substitutes therefor, such as centrifuging. This mechanical separation is performed subsequent to the addition to the clay hydrogel of the above-described aminoplast-forming amino compounds. The mechanical separation can take place at any desired temperature, room temperature being that preferably employed, although any temperature up to that of the boiling point of water may be utilized.

It is an essential step in the process to add a minor amount of a strong mineral acid to the hydrogel prior to the resin-forming step. Moreover, the acid must be added in an amount in excess of that required to acidify the surfaces of the clay particles dispersed throughout the hydrogel. The amount of acid to acidify the clay, i.e., to replace all the basic metals (mostly sodium, potassium, calcium) contained on the clay, will vary depending upon the acid which is used and the base exchange capacity of the clay. However, in the case of Hectorite clay to be acidified with phosphoric acid, the amount of acid must be at least over 7% and preferably at least 10% by weight, basis dry clay weight, is required. On the other hand, no more than about 50% and preferably no more than 35% by weight acid should be used, a range of from 10 to 20% being especially preferred. Though phosphoric acid is the preferred strong mineral acid, other mineral acids such as hydrochloric and sulfuric acid may be employed.

The thermosetting resins especially contemplated for use in the present process comprise those which are formed from amino compounds. The thermosetting resins which may be used here therefore fall into the class of "aminoplasts" as described in the book entitled "Fundamentals of Plastics," edited by Richardson and Wilson, chapters 5 and 6.

The aminoplast-forming amino compounds fall into several well-defined categories, only a few of which in each category are of any substantial economic importance. One class comprises amino compounds containing at least 2 amino groups per molecule, each group being attached to a carbon atom bearing a double bond. This group includes such commercially feasible materials as urea, thiourea, guanidine, benzoguanamine, melamine and dicyandiamide.

A second group comprises organic compounds containing a single amino radical, exemplified by aniline and the alkyl derivatives thereof. This group is referred to generally as aryl primary amines. Alkyl ureas, wherein one of the amino groups contains an alkyl radical substituted for one of the hydrogen atoms, are capable of forming aminoplast resins with aldehydes. Typical of this group are methyl, ethyl or propyl urea and the corresponding alkyl thioureas, as well as the corresponding alkyl guanidine compounds. Finally, the aryl sulfonamides are useful for the preparation of aminoplast resins such as benzene sulfonamide, toluene sulfonamide and other alkaryl sulfonamides. It will be noted that in all of these groups at least one of the amino radicals is attached to an unsaturated atom, either sulfur or carbon.

The aldehydes which may be polymerized with the amino compounds include either saturated or unsaturated aldehydes, which may, in turn, be either aliphatic or cyclic. Among those which may be used are formaldehyde, acrolein, furfural, acetaldehyde and crotonaldehyde. For reasons of reactivity as well as thermal stability, it is preferred to use aldehydes containing no more than about six carbon atoms. In the case of aliphatic aldehydes, it is particularly preferred to use only lower alkyl aldehydes, viz., those containing from 1 to 4 carbon atoms per molecule.

The ratio of monomers to be employed in the preparation of aminoplasts are those wherein the equivalent ratio of aldehyde to amine is between 0.9 and 1.5. "Equivalent ratio" as used herein refers to the ratio of reactive valences contained in the functional groups of the two materials being compared. Thus the equivalent ratio of one mole of aldehyde to one mole of melamine is 2:6 or 0.3 and to one mole of aniline 1:1 or 1.0.

The clays utilized in the subject class of greases are especially preferred for use in high temperature grease compositions due to their relatively inert character at these high operating temperatures. While clays of low base exchange capacity, such as Georgia clay, Attapulgite and the like, may be utilized, it is preferred that a high base exchange clay, such as Wyoming bentonite or Hectorite, be employed.

While the present invention is especially directed to extreme high-temperature lubricating greases, they may be employed for normal operating conditions as well. Likewise the polymer-coated clays of the invention can, by the selection of particular lubricating base oil stocks, be used for the preparation of greases to be used only at conventional temperatures. For example, mineral oils are generally stable up to about 300° F. Synthetic esters can generally be used up to temperatures of 350 to 400° F. Suitable synthetic esters include the phosphorus esters, silicon esters and aliphatic esters formed by esterification of aliphatic dicarboxylic acids with monohydric alcohols. Typical species of these ester materials include tricresyl phosphate, dioctyl phthalate, bis(2-ethylhexyl) silicate and the like.

Lubricants to be employed at temperatures in excess of about 400° F. are those having an inherent high thermal stability including the halocarbons and organo-silicone fluids. The halocarbons may be those described in Peterson et al. patent, U.S. 2,679,479, and include especially the fluorocarbon oils, preferably distilling above about 200° C. at atmospheric pressure. The most useful class of lubricants for grease compositions to be utilized at temperatures in excess of about 400° F. include the organo-substituted silicone fluids of lubricating oil viscosity. Of primary interest for this invention are the unreactive thermally stable silicone fluids, which will generally be of the following types:

Methyl silicone fluids

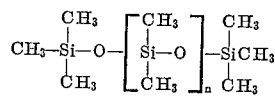

Methyl phenyl fluids

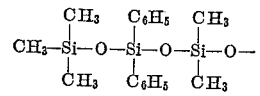

and/or

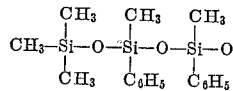

The above types of silicone fluids, in addition to being the most thermally stable are also the most readily available in commercial quantities. Methyl phenyl fluids are particularly preferred because of their still greater thermal stability.

It will, of course, be recognized that other organic groups as well as inorganic groups can replace a portion of the methyl groups, e.g., hydrogen, lower alkyls, halogens, etc. They are, however, generally too reactive and/or thermally instable for high-temperature applications, though from the standpoint of mere grease formation and use at temperatures at which they are stable, they are quite satisfactory for the grease compositions of the invention.

The viscosity of such polymer or copolymer is, of course, dependent upon the reaction conditions employed in preparing the same, e.g., the polymers of dimethyl silicon vary from thin liquids to viscous liquids to solid resins depending upon the conditions under which they are prepared. It is the liquid polymers and copolymers having a preferred viscosity exceeding 500 Saybolt seconds at 100° F., which are usually employed in preparing the new compositions.

Though not absolutely essential, it is preferred that the amine-containing resin-forming compound be added to the acidified clay slurry or hydrogel and thoroughly mixed therewith before the addition of any co-reacting compound. Thus in the case where a urea-formaldehyde resin is to be used, the urea would be added first and thoroughly mixed with the clay slurry. Or, in the situation where a more complex polymer such as a melamine-benzoguanamine-formaldehyde resin, both the melamine and benzoguanamine would be admixed with the slurry before adding the formaldehyde. In the case of aminoplasts in which both of the resin-forming components contain amino groups, i.e., in which the aldehyde also contains an amino group, it is preferred that only one be added and thoroughly mixed with the slurry, before proceeding to the polymerization step of the process.

After the first amine-containing reactant has been completely mixed with the clay slurry, the second reactant is added and likewise mixed thoroughly with the clay slurry. Though the temperature of this step and the immediately foregoing step is not particularly important, it is preferred that elevated temperatures, i.e., above room temperature, be used. As soon as the addition and mixing of the second resin-forming agent is completed, the temperature of the reaction mixture must then be raised to the boiling point of water and maintained at boiling conditions for a period of at least 10 and preferably 15 minutes to assure essentially complete polymerization. Longer times and higher temperatures may, however, be employed.

The relative amounts of the resin-forming compounds, i.e., the equivalent ratio of amine to formaldehyde, will vary widely according to the stoichiometry of the particular reactants which are used, as discussed hereinbefore. However, it is preferred that the total amount of resin be at least equal to 0.7 times the dry weight of the clay, a resin-to-clay weight ratio of from 1.0 to 1.5 being especially preferred. Though larger amounts of resin up to five times the clay weight may be used, the effectiveness of such heavily coated clay to form a stable grease structure is reduced thereby.

Upon the completion of the polymerization, the reaction mixture is then filtered to remove the greater part (at least 50%) of the water from the reaction slurry, leaving wet solid particles or "pearls." The pearls are then washed with hot water (at least 120° F.) to remove the excess acid remaining therein, and refiltered.

To the washed filtered pearls is added the lubricating oil and the two are mixed continuously while the mixture is heated to at least 250° F., preferably at least about 270° F. to drive off the remaining water in the mixture. The dehydrated mixture is then milled to form the final grease structure. Depending upon the milling equipment employed, it may be required that the milling operation be repeated one or more times. The temperature of the dehydrated mixture is preferably lowered to 180° F. or below prior to milling.

A very desirable and therefore preferred alternative to the foregoing procedure is to add all or part of the lubricating base oil to the mixture of clay and resin-forming reactants before the reaction mixture is heated to the boiling point of water. Using this procedure, the subsequent filtration and washing steps are facilitated by better separation of the water phase when at least 50% of the lubricating oil is added at this stage.

The examples which follow will illustrate the process of the invention:

EXAMPLE I

Hectorite clay was degangued and dispersed in water to form a 2% suspension. The dispersion was heated to 160° F. and 7% $H_3PO_4$ was mixed with the suspension. Following addition of the $H_3PO_4$, 53% aniline was added to the hot acidified slurry and thoroughly mixed. Then 20% formaldehyde in the form of a 36% solution was mixed into the slurry and the mixture was boiled for about 15 minutes. The boiled reaction mixture was then filtered, the residue was washed with hot water and the water-containing residue was then refiltered. The filtered residue was then mixed with 800% of a 500 SSU at 100° F. Neutral Oil which contained about 1.25% of sodium sebacate as a corrosion inhibitor and a like amount of phenyl beta-naphthylamine as oxidation inhibitor. The mixture of oil and polymer-coated clay was heated with stirring to about 260° F. to remove essentially all of the water therefrom and cooled. The dehydrated mixture of oil and clay was then milled three times through a 3-roll mill. The resultant grease had unworked and worked penetrations of 243 and 270, respectively. A 10,000 r.p.m. bearing test was performed on the grease which ran for over 400 hours at 300° F. without any indication of failure.

All of the above percentages are based on the weight of the dry clay.

EXAMPLE II

The same procedure as Example I was followed except that a phenylmethylpolysiloxane (DC 710) oil having a viscosity of 475–525 cs. at 77° F. was used as the lubricating base oil. About 1.17% sodium sebacate was added to the oil as a corrosion inhibitor. The proportions of the ingredients used were as follows:

| | Percent weight |
|---|---|
| Hectorite clay | 8.0 |
| $H_3PO_4$ | 0.6 |
| Aniline | 4.2 |
| Formaldehyde | 1.6 |
| Phenylmethylpolysiloxane oil | 85.6 |
| Sodium sebacate | 1.0 |
| | 100.0 |

The resultant grease had unworked and worked penetrations of 249 and 287 respectively.

EXAMPLE III

The same procedure as Example I was followed using diphenylguanidine in place of aniline and, in place of the DC 710, a polysiloxane oil (DC 510) having a viscosity of 50 cs. at 77° F. Approximately 1.25% by weight each of sodium sebacate and phenyl beta-naphthylamine was added to the polysiloxane oil to inhibit corrosion and oxidation respectively.

The proportions of the ingredients used were as follows:

| | Percent weight |
|---|---|
| Hectorite clay | 9.6 |
| $H_3PO_4$ | 0.7 |
| Diphenylguanidine | 5.5 |
| Formaldehyde | 1.4 |
| Polysiloxane oil | 80.8 |
| Sodium sebacate | 1.0 |
| Phenyl beta-naphthylamine | 1.0 |
| | 100.0 |

The resultant grease had an unworked penetration of 243 and a worked penetration of 270. The grease was run in the 10,000 r.p.m. bearing test for 372 hours at 450° F. before failure.

EXAMPLE IV

The same procedure as Example III was followed using phenyl biguanide in place of the diphenylguanidine, the proportions of the ingredients being as follows:

| | Percent weight |
|---|---|
| Hectorite clay | 9.3 |
| $H_3PO_4$ | 0.6 |
| Phenyl biguanide | 5.6 |

| | Percent weight |
|---|---|
| Formaldehyde | 2.4 |
| Polysiloxane oil | 80.1 |
| Sodium sebacate | 1.0 |
| Phenyl beta-naphthylamine | 1.0 |
| | 100.0 |

The resultant grease had worked and unworked penetrations of 285 and 290, respectively, and was operated in the 10,000 r.p.m. bearing test for 354 hours at 450° F. before failure.

EXAMPLE V

The same procedure as Example I was followed but using in place of the neutral oil, pentaerithritol ester to which had been added 1.19% sodium sebacate, 1.19% diphenylamine, and 0.6% phenothiazine. The proportion of the ingredients was as follows:

| | Percent weight |
|---|---|
| Hectorite clay | 7.6 |
| $H_3PO_4$ | 0.5 |
| Aniline | 3.9 |
| Formaldehyde | 1.5 |
| Pentaerithritol ester | 84.0 |
| Sodium sebacate | 1.0 |
| Diphenylamine | 1.0 |
| Phenothiazine | 0.5 |
| | 100.0 |

The resultant grease had ASTM penetrations of 245 unworked and 272 worked.

EXAMPLE VI

An acidified slurry of Hectorite clay containing less than 7% $H_3PO_4$ was prepared and heated in the manner of Example I. To the heated slurry was added 40% aniline, which was thoroughly mixed with the slurry. Formaldehyde was then added and the mixture was polymerized. The polymer-coated clay was extremely hydrophobic and had very little gelling effect.

The unexpectedly beneficial effect of higher amounts of excess acid are illustrated still further by the following example.

EXAMPLE VII

Five greases were prepared in accordance with the procedure of Example I. However, various amounts of acid ranging from 7 to 20% (basis clay weight) were used in the preparation of each in order to observe the effect of excess acid. The results are tabulated below:

*Table I*

ANILINE-FORMALDEHYDE COATED CLAY GREASES

[Lubricating base oil: Phenyl methyl polysiloxane oil (DC 550)]

| Sample No. | Weight Ratio, Polymer/Clay | Equivalent Ratio, HCHO/Amine | $H_3PO_4$, Percent by Wt. of Clay | Percent Clay for Unworked Penetration =260 |
|---|---|---|---|---|
| 1 | 0.7 | 1.2 | 7 | 10.5 |
| 2 | 0.85 | 1.2 | 10 | 8.2 |
| 3 | 1.1 | 1.2 | 10 | 8.2 |
| 4 | 0.85 | 1.2 | 15 | 7.7 |
| 5 | 1.1 | 1.2 | 20 | 6.8 |

From comparison of samples Nos. 2 and 3, it is immediately apparent that the polymer/clay ratio has no significant effect on yield within the range of ratios used here. Consequently, since the formaldehyde/amine ratio was constant throughout, the observed differences in yield are a function of acidity alone. The data show that yield decreases very sharply below 10% acid and that quite significant increases in yield are obtained up to about 20% acid, above which the increase in yield is somewhat smaller. Consequently, 10–20% acid appears to be the optimum and therefore the most preferred range.

EXAMPLES VIII AND IX

Two resin-coated greases were prepared in the manner of Example I using melamine for one and benzoguanamine for the other. Formaldehyde was the resin-forming co-reactant in each case. A phenylmethylpolysiloxane (DC 710) oil having a viscosity of 475–525 cs. at 77° F. was employed as the lubricating base oil. The weight ratio of polymer to clay in each was 1.1 and 1.2 for melamine and benzoguanamine, respectively, and 1.1 equivalents of formaldehyde per equivalent of amine were used. The hydrogel was acidified with 17% $H_3PO_4$ (based on the clay). The resultant greases prepared in accordance with the process of the invention were tested by means of the thin film oxidation and stability test for 300 hours at 450° F. Weight losses during the test were 32% for the melamine-formaldehyde coated clay grease and 39% for the benzoguanamine-formaldehyde coated clay grease. Both greases had satisfactory plastic consistency.

I claim as my invention:

1. A process for the preparation of polymer-coated clay-thickened grease, said clay being coated with an aminoplast resin, comprising the steps
   (a) forming a clay hydrosol;
   (b) admixing with the hydrosol
      (1) a mineral acid in excess of that required to completely acidify the surfaces of the clay, and
      (2) a plurality of coreactive aminoplast-forming compounds consisting of amines and aldehydes the equivalent ratio of aldehyde to amine being from 0.9:1 to 1.5:1;
   (c) heating the admixture of hydrosol and aminoplast-forming coreactants to at least the boiling point of water and maintaining the admixture at such temperature for a period of at least ten minutes, thus forming an aminoplast-resin coating on the clay;
   (d) removing at least 50% of the water and substantially all excess acid from the reaction mixture by filtering, water-washing and refiltering the washed filter residue the weight ratio of resin to clay, dry basis, having from 0.8:1 to 5.0:1;
   (e) admixing lubricating oil with the substantially acid-free filtered residue;
   (f) heating the admixture of lubricating oil and filter residue to a temperature of at least 250° F. to effect substantial dehydration thereof; and
   (g) milling the dehydrated admixture to form a grease.

2. The process of claim 1 in which (a) the weight ratio of resin to clay, dry basis, is from 1.0 to 1.5.

3. The process of claim 1 in which the clay is hectorite.

4. The process of claim 1 in which the lubricating oil is an organo-silicone fluid.

5. The process of claim 1 in which the aldehyde is admixed with the hydrosol following admixture of the amine therewith.

6. A process for the preparation of polymer-coated clay-thickened grease, said clay being coated with an aminoplast resin, comprising the steps
   (a) forming a clay hydrosol;
   (b) admixing with the hydrosol
      (1) a mineral acid in excess of that required to completely acidify the surfaces of the clay, and
      (2) a plurality of coreactive aminoplast-forming compounds consisting of amines and aldehydes the equivalent ratio of aldehyde to amine being from 0.9:1 to 1.5:1;
   (c) admixing with the mixture of hydrosol and aminoplast-forming coreactants a lubricating oil in an amount equivalent to at least 50% of the lubricating oil to be contained in the finished grease;
   (d) heating the admixture of hydrosol, aminoplastforming coreactants and lubricating oil to at least the boiling point of water and maintaining the admixture at such temperature for a period of at least 10 minutes the weight ratio of the resulting aminoplast resin to clay, dry basis, being from 0.8:1 to 5.0:1;

(e) removing at least 50% of the water and substantially all excess acid from the reaction mixture by filtering, water-washing and refiltering the washed filter residue;

(f) heating the substantially acid-free filter residue to a temperature of at least 250° F. to effect substantial dehydration thereof; and (g) milling the dehydrated admixture to form a grease.

7. The process of claim 1 in which the aldehyde is an aliphatic aldehyde.

References Cited by the Examiner
UNITED STATES PATENTS

| | | | |
|---|---|---|---|
| 2,829,100 | 4/1958 | Armstrong et al. | 252—28 |
| 2,890,171 | 6/1959 | Armstrong et al. | 252—28 |
| 3,036,001 | 5/1962 | Loeffler | 252—28 |

DANIEL E. WYMAN, *Primary Examiner.*